United States Patent [19]
Hronas et al.

[11] Patent Number: 5,657,679
[45] Date of Patent: Aug. 19, 1997

[54] METHOD AND APPARATUS FOR SEPARATING AN LOM SCULPTURE FROM AN ADHERENT BASE

[75] Inventors: John J. Hronas; Marcin Niemiec, both of Erie, Pa.

[73] Assignee: Multi-Products, Inc., Erie, Pa.

[21] Appl. No.: 578,015

[22] Filed: Dec. 26, 1995

[51] Int. Cl.$^6$ .................................................. B26D 1/02
[52] U.S. Cl. .......................... 83/870; 83/871; 83/16
[58] Field of Search ...................... 83/870, 871, 16, 83/171, 170, 651.1, 945, 200.1, 932; 264/138; 156/344, 584; 30/116, 115, 117

[56] References Cited

U.S. PATENT DOCUMENTS

| | | | |
|---|---|---|---|
| 789,612 | 5/1905 | Kelley et al. | 30/116 |
| 809,532 | 1/1906 | Schnackenberg | 30/116 |
| 818,528 | 4/1906 | Drummond | 30/116 |
| 846,974 | 3/1907 | Athanassiades | 83/651.1 |
| 1,636,812 | 7/1927 | Donovan | 83/651.1 |
| 1,864,921 | 6/1932 | Mayer | 83/200.1 |
| 4,033,213 | 7/1977 | Eiselt et al. | 83/651.1 |
| 4,398,347 | 8/1983 | Duffy | 83/200.1 |
| 4,481,059 | 11/1984 | Steck | 156/344 |
| 4,752,352 | 6/1988 | Feygin | 156/630 |
| 4,850,844 | 7/1989 | Hunting | 83/16 |
| 4,995,153 | 2/1991 | Asbery | 30/116 |
| 5,189,781 | 3/1993 | Weiss et al. | 29/527.2 |
| 5,354,414 | 10/1994 | Feygin | 156/630 |

Primary Examiner—Maurina T. Rachuba
Attorney, Agent, or Firm—William L. Krayer

[57] ABSTRACT

In "laminated object manufacturing" in which a prototype of an object is constructed by layering pieces of paper which are individually cut by a laser beam controlled by a 3-D computer design, method and apparatus are disclosed for severing the completed "build" from its base by a wire which is constricted to cut through a low-density layer between the base and the build.

10 Claims, 5 Drawing Sheets

METHOD AND APPARATUS FOR SEPARATING AN LOM SCULPTURE FROM AN ADHERENT BASE

TECHNICAL FIELD

This invention relates to laminated object manufacturing, wherein a computer-directed laser beam is used to create three-dimensional objects by impinging on sequentially stacked adhesive layers of paper. Each sheet of paper is cut to the dimensions of a thin cross section of the incipient object, and the unused portions of the paper are prepared for removal by vertical and horizontal cross-hatches or slices made by the laser beam. The block of laminated paper obtained is attached to a base by a layer of low-density adherent material, typically an adherent foam tape. The present invention is directed to methods and apparatus for removing the block of paper containing the sculpted object, in its block, or "build", from the base; in the new process the low-density adherent material is destroyed and/or separated from the block of laminated paper by constricting a wire through the layer of the low-density material.

BACKGROUND OF THE INVENTION

The basics of the laminated object manufacturing process are illustrated in Feygin's U.S. Pat. Nos. 4,752,352 and 5,354,414. There it will be seen that, utilizing a three-dimensional computer-assisted design, a laser beam is directed onto sheets of paper coated with adhesive to cut cross-sectional patterns for layering. The machine quickly builds a three-dimensional object one sheet at a time, cross-hatching the unused parts of each sheet so they can be removed in small cubes or other three-dimensional geometric forms. When the laser beam finishes its work, the result is a "build", or coherent stack of paper which includes the sculpted object within a multiplicity of small cubes or other geometric forms. These cubes are pre-cut, but still must be chiseled to loosen them from the relatively coherent mass. Likewise, and most relevant for the present invention, the body of the sculpted object must be removed from the base on which it is placed.

In the typical commercial laser machine for laminated object manufacturing, or "LOM" machine, the object is built initially on an aluminum plate. A piece of wood or particle board, typically one-half inch to one inch thick, is fastened to the top of the aluminum, and then a layer of adhesive foam tape covers the wood or particle board. The primary purpose of the foam tape (usually about 0.06 inch thick, or about 0.01 to 0.2 inch thick) is to secure the base of the sculpted object so it will not shift, move or creep from vibration, or otherwise confound the very precise abilities of the laser beam to make accurate cuts. It is this foam tape on which the first pieces of paper are placed for laser beam impingement. Frequently, the operator will permit ten or twenty layers of paper to be placed by the machine on the foam tape or other low-density layer before the pattern of the sculpted object is begun. These sheets are cut by the laser in a geometric pattern such as in squares so that the construction of cubes of the unwanted portions is begun. The laser beam may or may not be employed to cross-hatch the foam tape. The machine then goes on to carve the paper, sheet by sheet, piling on successive cross sections of the sculpted object. When its task is complete, the user removes the wood or particle board base (sometimes called herein a portable base), on which the three-dimensional paper build is adhered, from the aluminum platform, and is faced with the task of liberating the sculpted object from the build, which of course includes the step of removing the build from the board base.

The build must be removed from the base without damaging the sculpted object. Frequently, attempts to remove the build using chisels and other simple hand tools has resulted in damage or distortion of the object. The sculpted object at this point represents a considerable investment in CAD input and LOM time. The irony of damaging such a valuable, and frequently intricate, product of high technology through the use of hand tools and manual strength is apparent.

Direct application of automated cutting devices—for example, a band saw—through the low-density layer results in fouling and gumming up. A simple sharp blade will also gum up, and a heated nichrome wire also fouls. The application of solvent to the relatively thin low-density layer is mechanically almost impossible. There is a need for a more reliable and safe way to remove the block from its base.

SUMMARY OF THE INVENTION

We have invented a method and mechanism for removing a paper block or build made by laminated object manufacturing from its base without injuring it.

Our invention includes an apparatus for moving a wire through (or on the upper or lower surface of) the layer of low-density material such as foam tape which is employed between the portable base and the lowest layer of paper in the paper build. It also comprises a method of separating the paper build from the base by slicing through the low-density material with a wire.

More particularly, the invention comprises placing a wire in a loop around the perimeter of the low-density layer between the paper block and the base, and pulling it or tightening it on the level of the low-density layer until the loop becomes constricted to a small area, thus cutting through the low-density layer and separating the paper build from the portable base. A simple apparatus for tightening the loop comprises an elongated rigid member having stationary wire grasping means at one end for securing the wire and a series of lever holes or sockets at various distances from be stationary wire grasping means for receiving and providing a fulcrum for a lever, and a separate lever having readily adjustable means for grasping the wire. The wire is looped around the low-density layer, and pulled to tighten around it and further to cut into it so that, with successive placements of the lever in the lever sockets and pulling of the wire in generally the same direction each time, the wire loop becomes smaller as it cuts into and through the low-density tape, thus loosening and eventually severing the tape horizontally. Tightening of the wire may be mechanized through the use of cranks, motors, and the like.

Applicants are aware of the use of wire or string to separate cake from cake pans, either by looping around the circumference of the cake or simply pulling the wire or string through after grasping it at both ends. No lever is used or required for this operation.

BRIEF DESCRIPTION OF THE DRAWINGS

FIG. 1b and 1c employ a crank and a motor, respectively, to provide tension on the cutting wire in an assembly otherwise similar to FIG. 1a.

DETAILED DESCRIPTION OF THE INVENTION

The present invention comprises apparatus and methods for removing a paper block, or "build", from a base, wherein the paper build is attached to the base by an adhesive layer of low-density material, by cutting through the low-density material with a wire in the form of a loop around the low-density material. One form of the apparatus includes an elongated rigid member having holes which serve as the fulcrum for a lever; the lever includes means for holding a wire. A preferred form employs a crank; still another a motor. The apparatus and method will be described in detail with reference to the drawings.

Figure 1A:
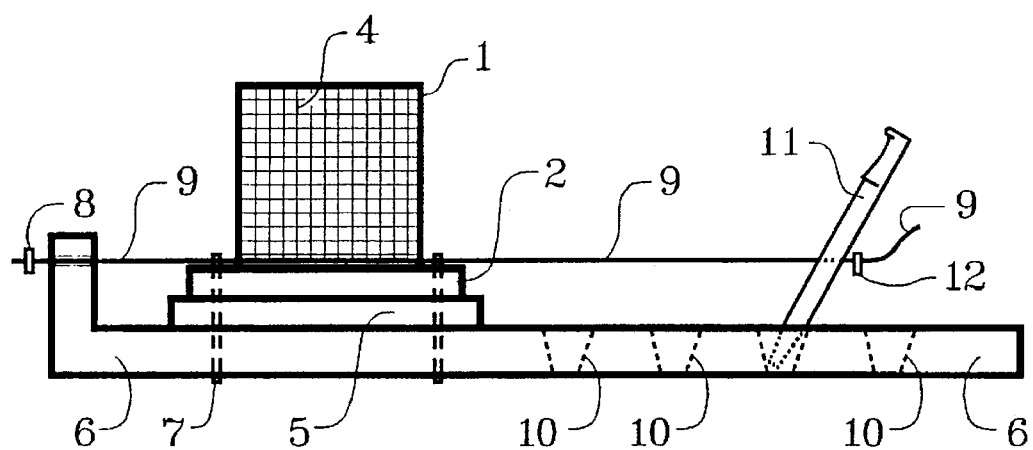
FIG. 1a is a side elevational view of a simple variant of our device having installed on it a portable base including a paper LOM build and showing the cutting wire ready to begin cutting.

In FIG. 1a, paper build 1 is seen to be in place on portable base 2, separated from the portable base 2 by low-density layer 3 (see FIG. 6), usually comprised of a low-density tape having a thickness from about 0.01 inch to about 0.2 inch. Paper build 1, as explained elsewhere herein, has crosshatches 4 made by the laser beam to expedite removal of the unused portions of the build 1 to expose the sculpted object which remains inside the build 1. Underneath portable base 2 is optional platform 5 which is an extension or upper layer of rigid member 6. Portable base 2 is optionally fastened firmly to rigid member 6 through platform 5 such as by bolts 7. At one end of rigid member 6 is adjustable wire holder 8 for clamping a strong wire 9. On the other side of the rigid member 6 is a series of fulcrum holes 10 for inserting lever 11. On lever 11 is a second adjustable wire holder 12. The height of adjustable wire holders 8 and 12 is such that when wire is stretched between them, the level of wire 9 will be substantially the same as the level of low-density layer 3, which is directly below build i and illustrated in FIG. 6. Wire 9, however, is not stretched directly across the distance from wire holder 8 to wire holder 12; rather, it is looped around the build 1 as will be seen below.

Figure 1B:
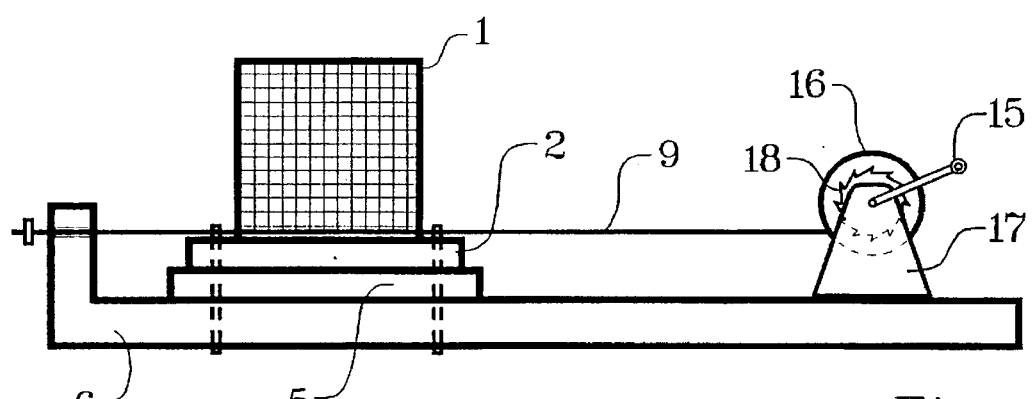
Figure 1C:
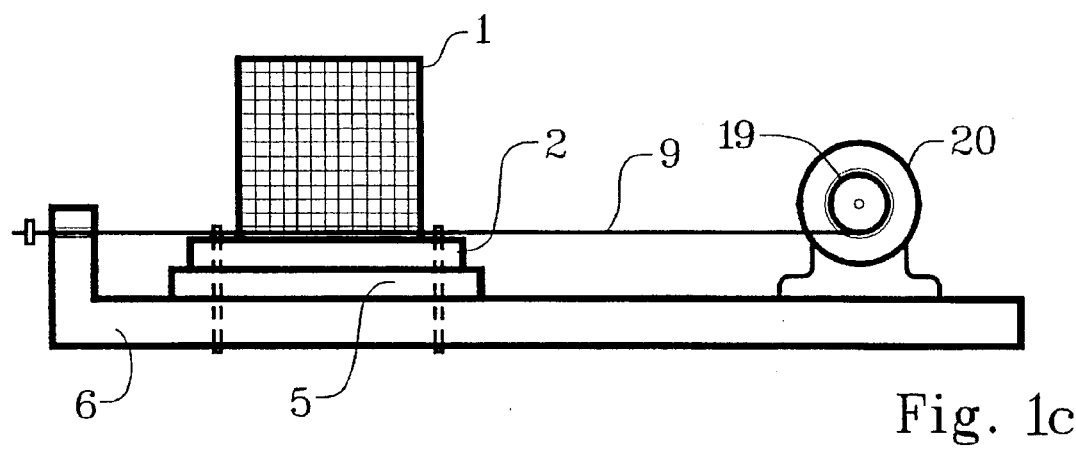

The preferred variation of FIG. 1b has no fulcrum holes 10; rather the lever 11 is replaced by crank 16 fastened to rigid member 6 by frame 17. The crank 16 places tension on wire 9 when handle 15 is turned, and the tension is maintained by ratchet 18. As seen in FIG. 1c, motor 20 having a spool 19 for wire 9 may also be substituted for the simple lever of FIG. 1a, and suitable electrical controls may be added to maintain or control the tension on wire 9.

Figure 2A:
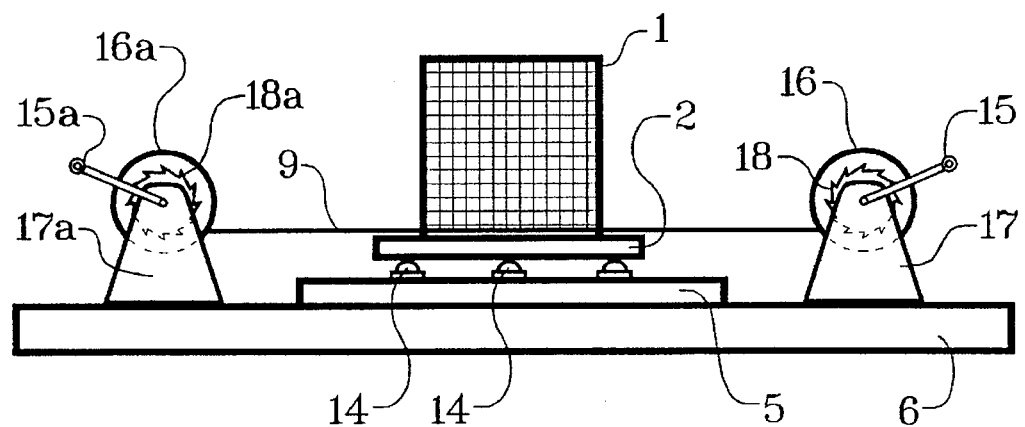
FIG. 2a is a side elevational view of a preferred apparatus having two cranks and wherein the base is seen to float on ball transfers, further illustrated in FIG. 2b.
Figure 2B:
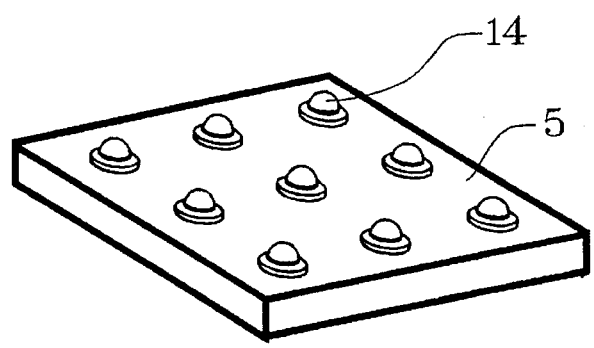

FIG. 2a shows the presently preferred variation having two cranks 16 and 16a. Crank 16a is similar to crank 16, having handle 15a, frame 17a, and ratchet 18a. Tension can thus be placed on wire 9 from either or both sides of build 1. This preferred variation includes a variation in platform 5, being equipped with ball transfers 14, shown also in FIG. 2b. Base 2 is permitted to "float" on the ball transfers 14 rather than be fastened by bolts 7 as in FIG. 1a.

Figure 3:
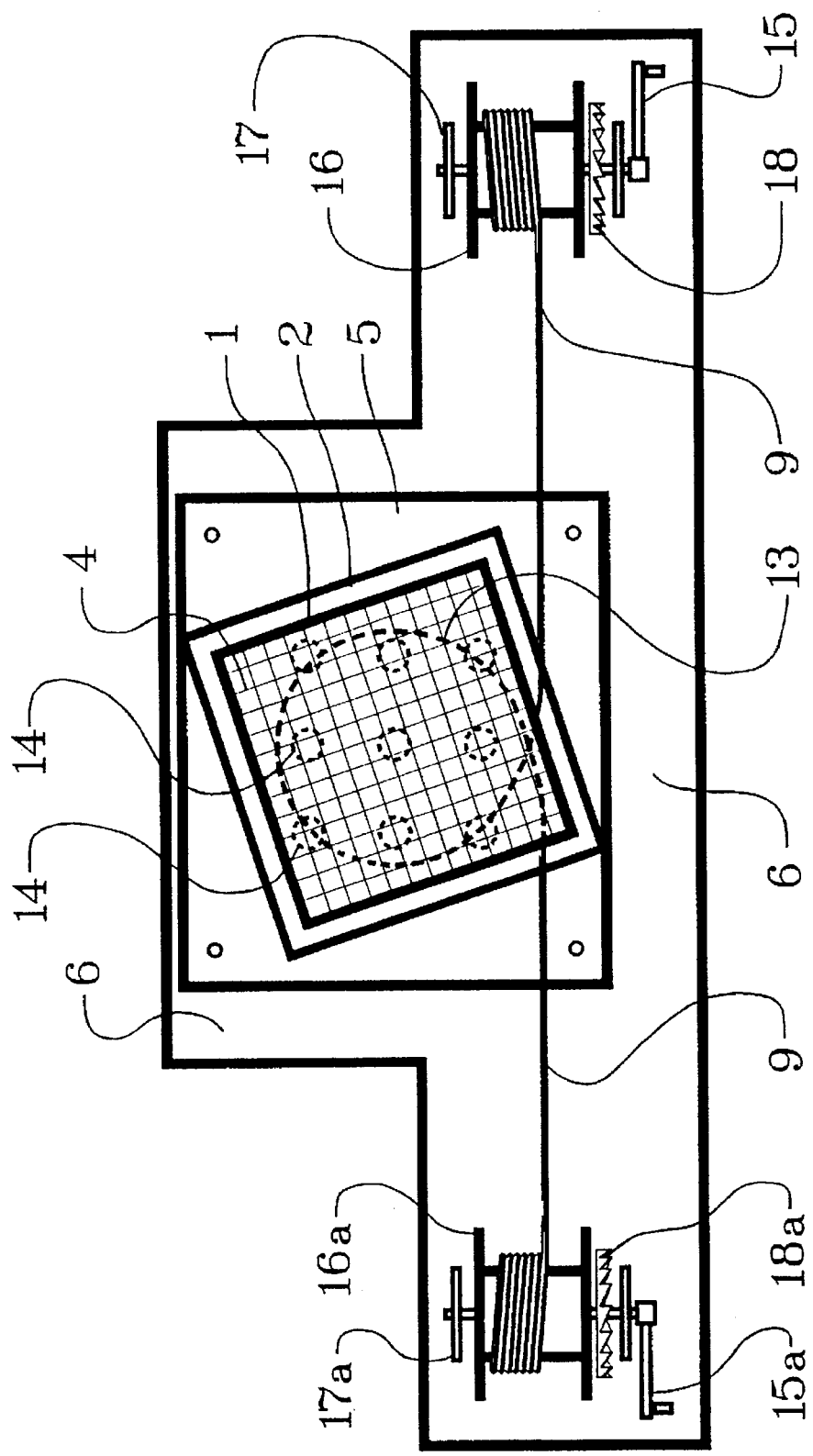
FIG. 3 is an overhead view of our device, showing the progress of the wire through the section of low density material.

FIG. 3, an overhead view of the apparatus, depicts the operation of the configuration of FIG. 2a shortly after it has started. Wire 9 was originally looped around the perimeter of the build 1, resting on base 2. At the point illustrated, cranks 16 and 16a have been activated to pull the wire 9, thus constricting loop 13 in wire 9. The loop 13 in wire 9 is completely buried in low-density layer 3 and, as illustrated, wire 9 may emerge from it at a point other than the corner of the low-density layer 3; moreover, base 2 has turned on ball transfers 14, carrying build i with it.

Figure 4:
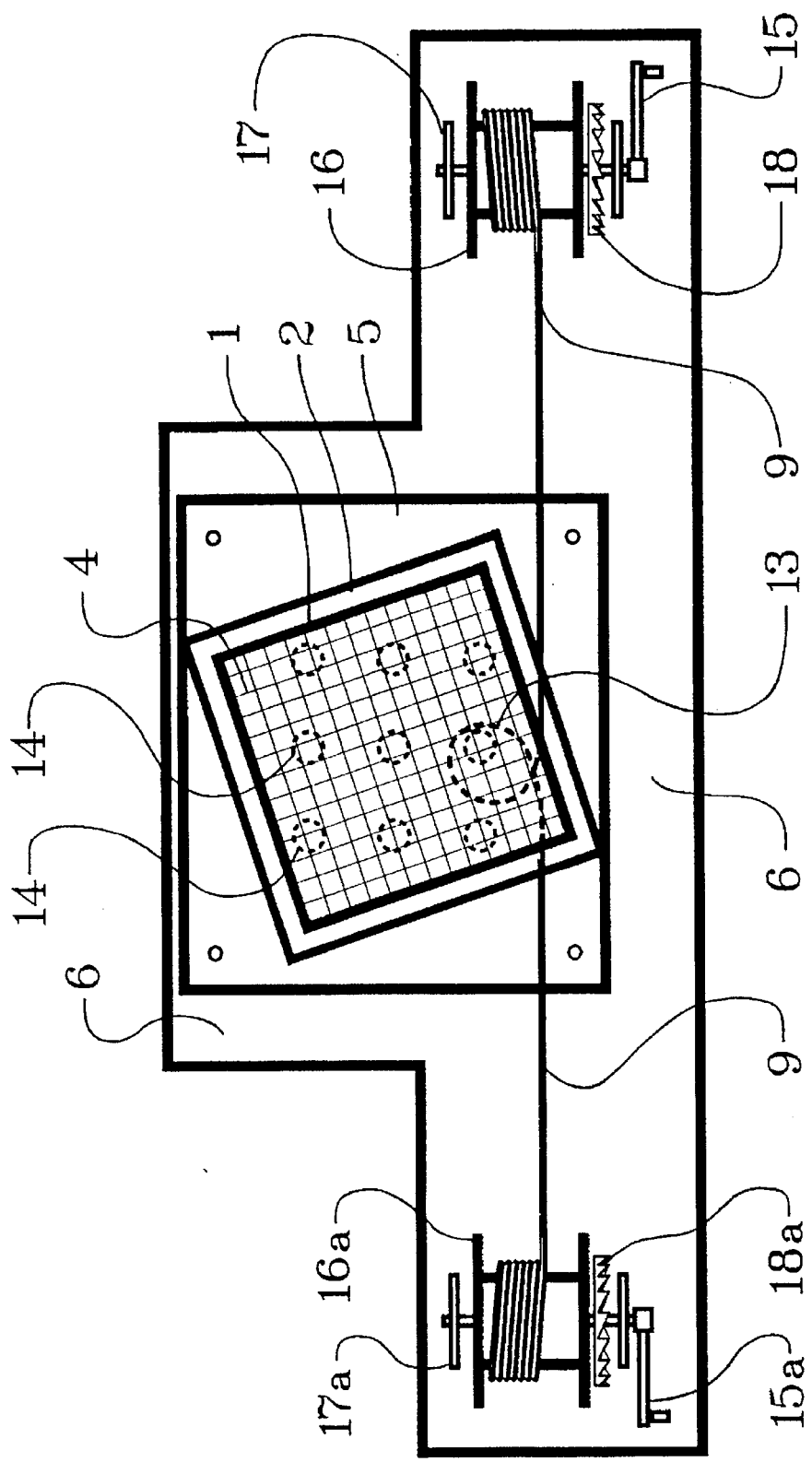
FIG. 4 is a second overhead view showing the further progress of the wire through the tape or low density material.

In FIG. 4, the wire 9 has almost completely severed the low-density layer 3 and loop 13 appears now as a relatively small circle. When the operation is in the position shown in FIG. 4—that is, when loop 13 is as small as depicted—it may be possible to remove the build 1 from the portable base by twisting it, with a chisel, or otherwise exerting the minimal force necessary; if the user is concerned about injuring the build, the operation can be continued until the loop 13 disappears and the low-density layer 3 has been completely severed.

Figure 5:
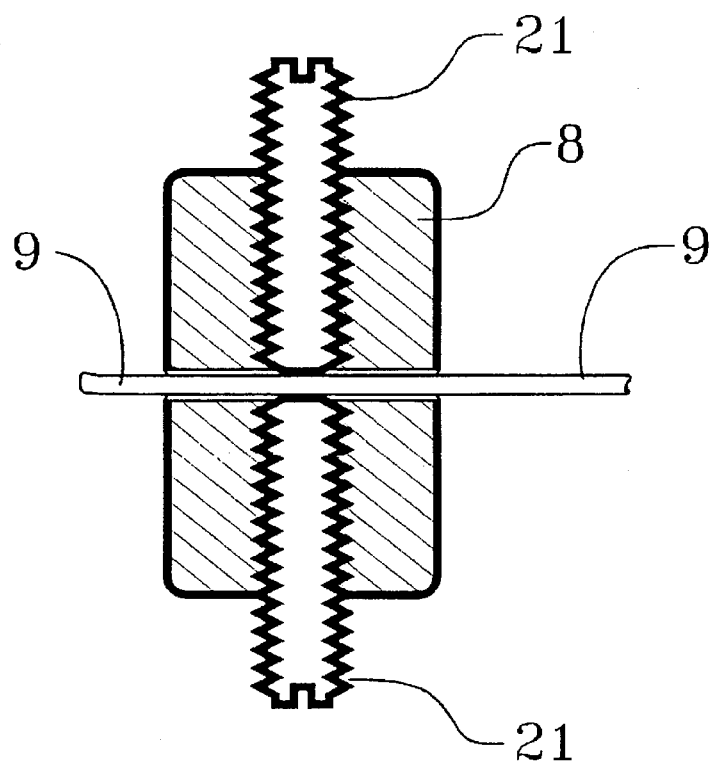
FIG. 5 is a sectional view of a preferred form of wire grasping means for the lever.

FIG. 5 shows a simple wire clamp which can be easily loosened and tightened for either the stationary wire holder 8 or wire holder 12 on lever 11 (FIG. 1a). It is illustrated for wire holder 8, which has at least one set screw 21 for applying pressure to wire 9.

Figure 6:
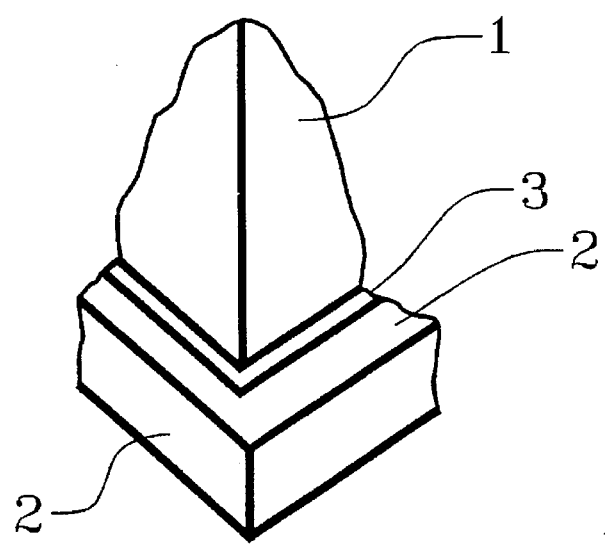
FIG. 6 is an expanded or close-up view of the low-density layer sandwiched between the paper block and the portable base.

FIG. 6 is an enlarged detail to show the position of low-density layer 3 between build 1 and portable base 2. When wire 9 is looped around build 1, it is made to rest on base 2 and thus is substantially at the same level as low-density layer 3, ready to cut through it.

The preferred apparatus of FIG. 2a is operated by (a) placing the base 2 on ball transfers 14; the base 2 has on it the build 1, separated from base 2 by the low-density layer 3, (b) looping wire 9 around build i at the level of low-density layer 3, and securing the wire 9 to cranks 16 and 16a so that the wire 9 can be straightened and (c) beginning to impose tension on wire 9. Ideally, the wire lies flat on portable base 2 when tension is first applied from lever 11 to draw wire 9 away from build 1, thus causing a constriction in the loop around low-density layer 3. The thus tensioned wire 9 cuts into low-density layer 3 as the tension is increased. The resulting increased length of wire 9 moving toward lever 11 is taken up by cranks 16 and 16a. Tension continues to be exerted on the wire and slack is taken up until the low-density layer has been severed.

It should be noted again that it is not necessary to fasten the portable base 2 to rigid member 6 through platform 5 or otherwise, as the portable base 2 and block 1 which is attached to it may be left free to rotate or otherwise move even if there are no ball transfers 14 on base 2. If base 2 is simply placed on the rigid member 6 or the platform 5, the entire assembly of build 1 and portable base 2 may turn when the wire 9 is tightened and the loop in the low-density layer 3 begins to constrict, as illustrated in FIG. 3. The ball transfers 14 virtually eliminate friction between base 2 and platform 6, however, and are therefore preferred, as all the energy of the constriction of the wire is then directed to its job of severing the connection of build 1 to base 2 through low-density layer 3.

There is no fixed distance from the build 1 for placement of wire holder 8, lever 11, motor 20, or cranks 16 and 16a. The fulcrum holes 10 are preferably of an internal diameter slightly larger than the diameter of the lower end of lever 11, to permit movement of the lever in them; alternatively, they may be slightly tapered, i.e. larger diameter at the top, as illustrated, so the lever can be activated easily.

While we have illustrated a simple screw clamp for wire holders 8 and 12, any clamp or holder capable of grasping the wire securely while permitting convenient adjustments will suffice.

We prefer to use piano wire for the wire 9 because it is strong and available. Piano wire of 0.032 inch diameter has been successfully used. Other diameters may be chosen by the practitioner depending on the density of the low-density layer and the tension expected to be placed on the wire 9. Generally, the low-density layer we have encountered has been in the range of densities of 1–5 pounds per cubic foot. Our invention is operable in this range but is not limited to it, as our invention is intended to include the severing of a laminated build from a base in the manner or with the apparatus described. While we have not yet seen a build made of a material other than paper, there is no reason our invention would not be applicable to LOM builds of other materials, so long as there is a low density layer at its base which can be severed by our wire apparatus and method.

In practice, we have found that the clamp for wire holder 8 is preferably adjusted as the severing process moves forward, to take up slack which develops on its side of the block 1. However, such adjustment is not essential, as the slack will ultimately be taken up by frequent adjustments of the placement of lever 11 together with adjustments of wire holder 12.

Persons skilled in the art may observe that the upwardly directed ball transfers 14 on platform 5 could perform a similar function if placed in a downward orientation on the bottom of base 2. Our invention includes such variations as well as any other devices for reducing friction between the lower surface of base 2 and the upper surface of platform 5.

We claim:

1. Method of separating a laminated build from a base, wherein said laminated build is attached to said base by a low-density layer, comprising placing a wire around the perimeter of said low-density layer and constricting said wire until said laminated build is separated from said base.

2. Method of claim 1 wherein said wire is a piano wire.

3. Method of claim 1 wherein a first end of said wire is fixed and a second end of said wire is pulled to tension and constrict said wire.

4. Method of claim 1 wherein said low-density layer is about 0.01 to 0.2 inch thick.

5. Method of claim 1 wherein said low-density layer has a density of one to five pounds per cubic foot.

6. Method of claim 1 wherein said laminated build is made of paper and by laminated object manufacturing.

7. Method of claim 1 wherein said wire is constricted through the use of at least one crank.

8. Method of claim 1 wherein said base is placed on a platform.

9. Method of claim 8 wherein said base is fastened to said platform.

10. Method of claim 8 wherein said base is permitted to turn on said platform while said wire is constricted.

* * * * *